| United States Patent [19] | [11] Patent Number: 4,808,754 |
|---|---|
| Guggenheim et al. | [45] Date of Patent: Feb. 28, 1989 |

[54] SPIROBIINDANE BIS-AMINOPHENOXY ETHERS

[75] Inventors: Thomas L. Guggenheim, Scotia, N.Y.; Joseph W. Guiles, Ft. Collins, Colo.; Sharon J. McCormick, Scotia, N.Y.

[73] Assignee: General Electric Company, Schenectady, N.Y.

[21] Appl. No.: 20,264

[22] Filed: Feb. 27, 1987

[51] Int. Cl.$^4$ .................................. C07C 147/107
[52] U.S. Cl. .................................... 564/428; 528/185; 528/271; 528/335; 528/344; 528/348; 564/315; 564/426; 568/586
[58] Field of Search ................. 564/428, 426, 315

[56] References Cited

U.S. PATENT DOCUMENTS

| 4,096,173 | 6/1978 | Molloy ................. 564/428 |
| 4,454,347 | 6/1984 | Parham et al. ........... 564/428 |
| 4,734,482 | 3/1988 | Tamai et al. ............ 528/185 |

FOREIGN PATENT DOCUMENTS 0192480  2/1986  European Pat. Off. .

*Primary Examiner*—Harold D. Anderson
*Attorney, Agent, or Firm*—William H. Pittman; James C. Davis, Jr.; James Magee, Jr.

[57] ABSTRACT

Cyclic polyamide oligomers are prepared by the reaction of various spirobiindane diamines, including spirobiindane bisphenol bis-aminophenoxy ethers, with dicarboxylic acid chloride such as isophthaloyl chloride. The oligomer compositions may be converted to copolyamides by reaction with lactams in the presence of basic reagents.

4 Claims, No Drawings

SPIROBIINDANE BIS-AMINOPHENOXY ETHERS

This invention relates to polyamides and intermediates for their preparation. More particularly, it relates to cyclic polyamides.

Polyamides are a valuable class of resinous materials useful in many areas including fiber formation, molding and formation of blends with other polymers. Particularly useful properties of polyamides are high tensile strength and solvent resistance. For the most part, polyamides are prepared either by the reaction of diamines with dicarboxylic acids or their derivatives or by ring-opening polymerization of lactams.

A recent innovation in the preparation of certain linear polymers involves the use of cyclic oligomer compositions as intermediates. For example, cyclic polycarbonate oligomer mixtures, disclosed in European patent application 162,379 and in copending, commonly owned application Ser. No. 704,122, filed Feb. 22, 1985, now U.S. Pat. No. 4,644,053, are readily convertible under very favorable conditions to linear polycarbonates of very high molecular weight.

It has become of interest to develop intermediates for the preparation of polyamides which are analogous to said cyclic polycarbonate oligomers. Such intermediates have potential for conversion to linear polyamides, and also to random and block copolyamides including polyamide-polycarbonates.

The present invention provides a class of novel cyclic polyamide oligomers and methods for their preparation. Said polyamides may be converted to linear homo- and copolyamides. Also provided is a class of novel diamines suitable for conversion to said cyclic polyamide oligomers.

In one of its aspects, the present invention includes compositions comprising cyclic polyamide oligomers of the formula

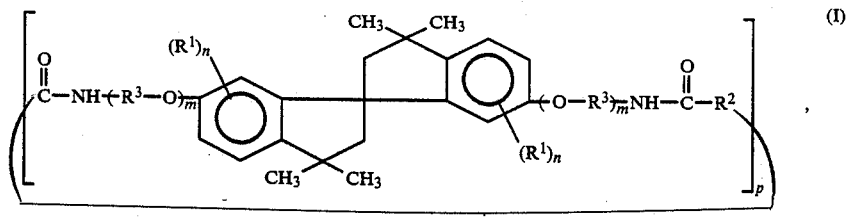 (I)

wherein each $R^1$ is independently $C_{1-4}$ primary or secondary alkyl or halo, $R^2$ is a substituted or unsubstituted alkylene or arylene radical other than o-arylene, $R^3$ is a substituted or unsubstituted $C_{2-4}$ alkylene, m-phenylene or p-phenylene radical, m is 0 or 1, n is 0-3 and p is from 1 to about 15.

It will be apparent from formula I that the cyclic polyamide oligomers of this invention are derivatives of diamines having a 3,3,3',3'-tetramethyl-bis-1,1'-spiroindane nucleus, hereinafter sometimes referred to as a "spirobiindane" nucleus for brevity. The $R^1$ values are each $C_{1-4}$ primary or secondary alkyl or halo and are preferably methyl or chloro. The value of n is 0-3, usually 0 or 1 and preferably 0.

The $R^2$ values may be considered as derived from dicarboxylic acids of the formula $R^2(COOH)_2$, and may be substituted or unsubstituted alkylene or arylene radicals. The alkylene radicals generally contain about 2-8 carbon atoms, about 2-4 thereof usually being in a straight chain. They are illustrated by ethylene, trimethylene and tetramethylene, as well as branched isomers thereof. The arylene radicals, which are preferred, generally contain about 6-25 carbon atoms and are illustrated by m-phenylene, p-phenylene, the corresponding tolylene radicals, 4,4'-biphenylene, 1,4-naphthylene, 1,8-naphthylene and divalent phenylindane radicals of the formula

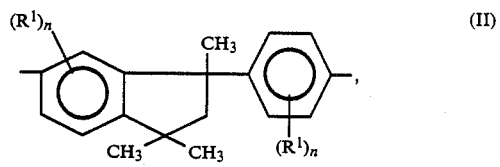 (II)

wherein $R^1$ and n are as previously defined. Any substituent which does not undergo interfering reactions in the context of this invention may be present thereon. Illustrative substituents are halo, nitro, hydroxy and alkoxy. The arylene hydrocarbon radicals, especially m-phenylene, are most preferred.

The $R^3$ radicals are most often unsubstituted m- or p-phenylene. The value of m may be 0 or 1; that is, the $-O-R^3-$ moiety may be present or absent in the oligomer compositions of the invention.

The cyclic polyamide oligomer compositions of this invention include oligomers having degrees of polymerization (p values) from 1 to about 15. For the most part, said compositions are mixtures of oligomers having varying degrees of polymerization. However, it is frequently possible to isolate individual oligomers, particularly the compound in which p is 1, by conventional means such as preparative scale high pressure liquid chromatography. Said oligomer species are hereinafter sometimes identified as "monomer", "dimer", etc., according to the value of p.

Said compositions may be prepared from the corresponding spirobiindane diamines, as described hereinafter. The diamines in which $R^1$ is m- or p-phenylene and m is 1, and corresponding nitro compounds, are novel compounds. Accordingly, another aspect of this invention is spirobiindane bis-nitrophenoxy and bis-aminophenoxy ethers having the formula

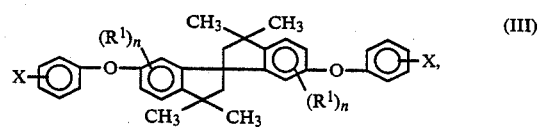 (III)

wherein $R^1$ and n are as previously defined and X is $NH_2$ or $NO_2$ and is in the m- or p-position.

The bis-nitrophenoxy ethers may be prepared by the reaction of halonitrobenzenes or dinitrobenzenes with spirobiindane bisphenol salts under alkaline conditions in a dipolar aprotic solvent. The molar ratio of nitro compound to spirobiindane bisphenol salt is generally about 2.0–2.5. The bis-aminophenoxy ethers may be prepared by reduction of said bis-nitrophenoxy ethers by conventional means such as catalytic hydrogenation.

The preparation of the bis-nitrophenoxy and bis-aminophenoxy ethers is illustrated by the following examples. The compound 6,6'-dihydroxy-3,3,3',3'-tetramethyl-bis-1,1'-spiroindane is identified hereinafter as "SBI".

EXAMPLE 1

A reaction vessel fitted with a mechanical stirrer, reflux condenser and nitrogen purge means was charged with 45.9 grams (149 mmol.) of SBI, 49.31 grams (303 mmol.) of p-chloronitrobenzene, 61.68 grams (447 mmol.) of potassium carbonate and 700 ml. of dry dimethylformamide. The mixture was purged with nitrogen and heated at 150° C. with stirring for 14 hours. It was then poured into 1.5 liters of ice water with rapid stirring, and the precipitated 6,6'-bis(4-nitrophenoxy)-3,3,3',3'-tetramethyl-bis-1,1'-spiroindane was recrystallized from methyl ethyl ketone. The yield was 73.7 grams (90% of theoretical) of a crystalline product, m.p. 200.5°–201.5° C. The structure was confirmed by elemental analysis.

EXAMPLE 2

A mixture of 5.27 grams (9.58 mmol.) of the product of Example 1, 100 mg. of platinum oxide and 100 ml. of tetrahydrofuran was pressurized with hydrogen at 50 psi. and shaken for 3 hours at room temperature. The mixture was filtered, using a filter aid material, and the filtration residue was washed with methylene chloride. The combined filtrates were vacuum stripped to yield 4.6 grams (98% of theoretical) of 6,6'-(4-aminophenoxy)-3,3,3',3'-tetramethyl-bis-1,1'-spiroindane, which was recrystallized from toluene to yield the pure product as fine crystals, m.p. 214°–215° C. The structure was confirmed by elemental analysis.

EXAMPLE 3

In a reaction vessel similar to that of Example 1, a mixture of 24.51 grams (79.6 mmol.) of SBI, 27.40 grams (163.1 mmol.) of m-dinitrobenzene, 43.93 grams (318.4 mmol.) of potassium carbonate and 175 ml. of dimethyl sulfoxide was heated for 30 hours at 140° C., under nitrogen. The mixture was cooled and diluted with 500 ml. of methylene chloride, and was washed with 10% aqueous sodium hydroxide solution, water and aqueous sodium chloride solution. The organic phase was filtered and the filtration residue was rinsed with methylene chloride. The combined filtrates were vacuum stripped to yield 42.5 grams of the product as a thick oil. A portion of the oil was purified by medium pressure liquid chromatography of an ethyl acetate-hexane solution over silica gel. The purified 6,6'-(3-nitrophenoxy)-3,3,3',3'-tetramethyl-bis-1,1'-spiroindane was obtained in 66% yield, m.p. 174°–175° C. The structure was confirmed by elemental analysis.

EXAMPLE 4

Following the procedure of Example 2, 2.5 grams (4.5 mmol.) of the product of Example 3 was hydrogenated over a platinum oxide catalyst. Upon solvent removal and recrystallization from a toluene-cyclohexane mixture, there was obtained 1.8 grams (80% of theoretical) of analytically pure 6,6'-(3-aminophenoxy)-3,3,3',3'-tetramethyl-bis-1,1'-spiroindane, m.p. 190°–197° C. with decomposition. The structure was confirmed by elemental analysis.

The cyclic polyamide oligomer compositions of this invention may be prepared by gradually adding (A) a dicarboxylic acid chloride of the formula $$R^2(COCl)_2$$

to a solution in a substantially inert organic liquid of (B) a diamine of the formula

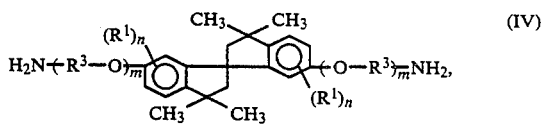

wherein $R^1$, $R^2$ and n are as previously defined, at a temperature effective to achieve reaction of said diamine with said dicarboxylic acid chloride; reagents A and B being employed in a molar ratio in the range of about 0.8–1.25:1. This method of preparation is another aspect of the invention.

Diamines useful as reagent B include the bis-aminophenoxy ethers of this invention and in addition the 6,6'-diamino-3,3,3',3'-tetramethyl-bis-1,1'-spiroindanes; that is, the compounds of formula III in which m is 0. Such compounds are known in the art and may be prepared, for example, by oxidation of the corresponding 6,6'-dimethyl compounds to dicarboxylic acids followed by treatment with sodium azide and sulfuric acid (i.e., the Schmidt reaction), as described in Curtis et al., J. Chem. Soc., 1962. 418–421.

Any organic liquid which is substantially inert to the diamines and acid chlorides employed may be used in the preparation of the oligomer compositions. In the case of aromatic diamines, suitable liquids include halogenated alkanes such as methylene chloride and chloroform; aprotic polar solvents such as dimethylformamide, dimethylacetamide and dimethyl sulfoxide; aromatic hydrocarbons and chlorinated aromatic hydrocarbons such as toluene, xylene and chlorobenzene; and ethers such as tetrahydrofuran and ethylene glycol dimethyl ether. In most instances, relatively volatile solvents such as methylene chloride, chloroform and tetrahydrofuran are preferred by reason of the ease of removal thereof by evaporation following completion of the reaction.

According to the invention, reagent A is gradually added to a solution of reagent B in the organic liquid. It is also most often added in the form of a solution in said liquid. The reagents are employed in molar ratios in the range of about 0.8–1.25:1 and preferably about 0.95–1.05:1.

In one embodiment of the invention, the entire portion of reagent B is initially present in the reaction vessel. Its concentration should then be up to about 0.03 M to optimize the yield of cyclics. A second embodiment is to introduce both of reagents A and B simultaneously to said organic liquid, whereupon reagent B is ordinarily also added as a solution.

It is sometimes advantageous to employ a hydrogen chloride acceptor in the reaction. Suitable hydrogen chloride acceptors are moderately strong bases such as alkali metal carbonates and tertiary amines, preferably sodium carbonate, triethylamine and pyridine. Said acceptor is generally present with reagent B, being either in the reaction vessel originally or introduced simultaneously with reagent A. The proportion thereof is preferably at least stoichiometric, most often about 1–3 equivalents per calculated equivalent of hydrogen chloride evolved.

Any reaction temperature effective to achieve reaction of the diamine with the dicarboxylic acid chloride may be employed. Elevated temperatures, such as in the range of about 35°–100° C., are usually satisfactory, with about 40°–60° C. being preferred.

It is believed that two factors are important in providing the driving force for this reaction. One is maintenance of reagents A and B in relatively high dilution in the organic liquid; such high dilution promotes cyclization in preference to linear polyamide formation. The other is the favorable steric orientation of spirobiindane-derived compounds, such as the diamines of formula III, with respect to formation of cyclic oligomers.

The cyclic polyamide oligomer compositions obtained by the method of this invention may also contain linear oligomers and high polymer (i.e., linear polyamides having a degree of polymerization greater than about 20). Any high polymer can typically be removed by conventional means such as flash chromatography on silica gel. When employing isophthaloyl dichloride and the bis-aminophenoxy ethers of this invention, cyclics yields of 90% or greater are typical.

The preparation of cyclic polyamide oligomer compositions is illustrated by the following examples.

EXAMPLE 5

A reaction vessel fitted with a septum cap, a reflux condenser and nitrogen purge means was charged with 5 ml. of chloroform which was brought to reflux in a nitrogen atmosphere. There were simultaneously added over ½ hour, via two syringes, a solution of 505.4 mg. (1.03 mmol.) of the diamine of Example 2 and 213 mg. (2.11 mmol.) of triethylamine in 5 ml. of dry tetrahydrofuran, and a solution of 209 mg. (1.03 mmol.) of isophthaloyl chloride in 5 ml. of dry chloroform. Refluxing was continued for 5 minutes, after which the mixture was diluted with 50 ml. of chloroform, washed with dilute aqueous hydrochloric acid solution and with sodium chloride solution, filtered through phase separation paper and vacuum stripped, yielding 520 mg. (80% of theoretical) of the desired cyclic polyamide oligomer mixture, m.p. 245°–285° C. It was shown by high pressure liquid chromatography to contain cyclic oligomers with degrees of polymerization up to about 15, with monomer to hexamer species being present in the approximate ratios 78:28:8:4:2:1. The presence of the monomer and dimer was confirmed by field desorption mass spectrometry.

The cyclic monomer species was isolated by preparative scale high pressure liquid chromatography. Its identity was also confirmed by field desorption mass spectrometry.

EXAMPLE 6

A reaction system similar to that of Example 5 was charged with 62 ml. of chloroform which was brought to reflux in a nitrogen atmosphere. There were simultaneously added over 40 minutes a solution of 1 gram (2.04 mmol.) of the diamine of Example 4 and 490 mg. (4.85 mmol.) of triethylamine in 10 ml. of dry tetrahydrofuran, and a solution of 500 mg. (3.46 mmol.) of isophthaloyl chloride in 10 ml. of dry chloroform. Refluxing was continued for 15 minutes, after which the mixture was diluted with methylene chloride, washed with dilute aqueous hydrochloric acid solution and vacuum stripped, yielding 1.33 grams of the desired cyclic polyamide oligomer mixture. It was shown by high pressure liquid chromatography to contain monomer to heptamer species in the approximate ratios 18.9:5.6:1.2:1.6:1.3:0.9:1.

EXAMPLE 7

A solution of 1 gram (2 mmol.) of the diamine of Example 2 and 410 mg. (4 mmol.) of triethylamine in 36 ml. of dry tetrahydrofuran was heated to reflux and a solution of 410 mg. (2 mmol.) of isophthaloyl chloride in 5 ml. of chloroform was added over ½ hour. Upon workup as in Example 5, there was obtained a product shown by high pressure liquid chromatography to contain over 90% cyclic polyamide oligomers, with monomer to octamer species being present in the approximate ratios 18.4:7.9:4.5:2.9:2.0:1.6:1.2:1.

EXAMPLE 8

Following the procedure of Example 7, a solution of 2 mmol. of isophthaloyl chloride in 5 ml. of chloroform was added to a mixture of 2 mmol. of the diamine of Example 2, 650 mg. (6 mmol.) of sodium carbonate and 200 ml. of dry chloroform. Upon workup, there was obtained 1.2 grams of a tan solid containing about 90% cyclics, with monomer to hexamer species being present in the approximate ratios 11.03.6:2.3:1.4:1.2:1.

EXAMPLE 9

Following the procedure of Example 7, a solution of 2 mmol. of isophthaloyl chloide in 5 ml. of chloroform was added to a solution of 2 mmol. of the diamine of Example 2 in 77 ml. of dry chloroform, in the absence of hydrogen chloride acceptors. There was obtained 900 mg. of a yellow solid containing 90% cyclics, with monomer to hexamer species being present in the approximate ratios 16.2:3.1:1.7:1.0:1.1:1.

EXAMPLES 10–11

The procedure of Example 7 was repeated substituting 4,4'-biphenyldicarboxylic acid chloride and 1,1,3-trimethyl-3-phenylindane-4',5-dicarboxylic acid chloride, respectively, for isophthaloyl chloride on an equimolar basis. The products were shown to contain the following approximate ratios of molecular species:

EXAMPLE 10-monomer to decamer, 7.4:7.3:4.4:3.1:2.3:2.1:1.6:1.4:1.2:1.

EXAMPLE 11-monomer to heptamer, 4.4:5.2:11.3:6.3:3.3:1.7:1.

EXAMPLE 12

To a reaction vessel containing 12 ml. of dry methylene chloride at reflux temperature were added over ½ hour under nitrogen, with stirring, a solution of 200 mg. (0.65 mmol.) of 6,6'-diamino-3,3,3',3'-tetramethyl-1,1'spiroindane and 132 mg. (1.3 mmol.) of triethylamine in 4 ml. of methylene chloride, and a solution of 133 mg. (0.65 mmol.) of isophthaloyl chloride in 4 ml. of methylene chloride. The mixture was cooled to room temperature, diluted with 50 ml. of methylene chloride, washed twice with dilute aqueous hydrochloric acid solution and once with aqueous sodium chloride solution, dried over magnesium sulfate and vacuum stripped. There was obtained 270 mg. of a white solid which was shown by high pressure liquid chromatography and field desorption mass spectroscopy to contain approximately 50% cyclic polyamide oligomers, with the balance being linear oligomers and high polymer.

The cyclic polyamide oligomers of this invention may be converted to copolyamides by reaction with at least one lactam of the formula

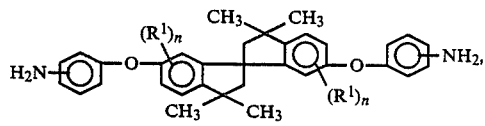

wherein $R^4$ is a divalent aliphatic hydrocarbon or substituted hydrocarbon radical containing a chain of about 2-20 crrbon atoms, in the presence of a basic reagent. This method and the copolyamides thus produced are another aspect of the invention.

Any of a number of known lactams may be used. Preferred are those in which $R^4$ is a straight alkylene chain containing about 4-12 carbon atoms. Illustrative lactams are pivalolactam, δ-valerolactam, ε-caprolactam and laurolactam, in which $R^4$ is $CH_2C(CH_3)_2$, $(CH_2)_4$, $(CH_2)_5$ and $(CH_2)_{11}$, respectively. ε-Caprolactam is especially preferred.

The basic reagents include inorganic bases such as the alkali and alkaline earth metals and their hydrides, hydroxides, carbonates and alkoxides, and strong organic bases such as tetraalkylammonium hydroxides, guanidines, and organometallics including Grignard reagents and organolithium reagents. The alkali metal hydrides, especially sodium hydride, are preferred.

The reaction between the lactam, basic reagent and cyclic polyamide oligomer composition typically takes place at elevated temperatures. In general, temperatures of about 25°-200° C., preferably about 90°-150° C., are adequate to effect reaction of the lactam with the basic reagent to form an anionic intermediate, which subsequently reacts with the oligomer composition at temperatures in the range of about 200°-300° C. The proportions of lactam and oligomer composition are not critical but may be varied according to the desired stoichiometry of the product.

The copolyamides of this invention typically comprise structural units of the formula

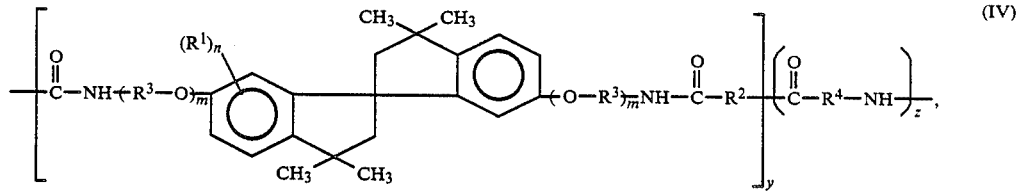

wherein $R^{1-4}$ and m are as previously defined and each of y and z is a positive number. The utilities of such copolyamides are similar to those of known polyamides.

The preparation of the copolyamides of this invention is illustrated by the following example.

EXAMPLE 13

A mixture of 7.5 grams of a cyclic polyamide oligomer mixture similar to that of Example 5, 7.5 grams of caprolactam and 237 mg. (15 mole percent based on caprolactam) of sodium hydride was heated in a test tube at 140° C. in a nitrogen atmosphere for 1 hour, during which time melting occurred and hydrogen was evolved. It was then heated for 10 minutes at 265° C. and cooled. The solid product was removed by breaking the test tube and a portion thereof was dissolved in chloroform and treated with trifluoroacetic anhydride, whereupon the polymer dissolved. Gel permeation chromatographic analysis of the solution showed the presence of a copolyamide having a number average molecular weight of 22,000 and a weight average molecular weight of 47,000.

What is claimed:

1. A spirobiindane bis-aminophenoxy ether having the formula wherein each $R^1$ is independently $C_{1-4}$ primary or secondary alkyl or halo, the $NH_2$ groups are in the m- or p-positions and n is 0–3.

2. An ether according to claim 1 wherein the $NH_2$ groups are in the m-positions.

3. An ether according to claim 1 wherein the $NH_2$ groups are in the p-positions.

4. An ether according to claim 1 wherein n is 0.

* * * * *

UNITED STATES PATENT AND TRADEMARK OFFICE
CERTIFICATE OF CORRECTION

PATENT NO.  :  4,808,754
DATED       :  February 28, 1989
INVENTOR(S) :  Thomas L. Guggenheim and Joseph W. Guiles It is certified that error appears in the above-identified patent and that said Letters Patent is hereby corrected as shown below:

Title Page, Item [75], the name of Sharon J. McCormick should be removed as a joint inventor.

Signed and Sealed this

Eleventh Day of July, 1989

Attest:

DONALD J. QUIGG

Attesting Officer

Commissioner of Patents and Trademarks